United States Patent [19]

Smith, III

[11] Patent Number: 4,813,454
[45] Date of Patent: Mar. 21, 1989

[54] UNDERSEA COUPLING WITH PRESSURE BALANCING PORTS

[75] Inventor: Robert E. Smith, III, Stafford, Tex.

[73] Assignee: National Coupling Company, Inc., Stafford, Tex.

[21] Appl. No.: 85,931

[22] Filed: Aug. 17, 1987

[51] Int. Cl.$^4$ .............................................. F16L 37/28
[52] U.S. Cl. .............................. 137/614.04; 137/614; 137/236.1
[58] Field of Search .............. 137/614.02, 614, 614.04, 137/236.1

[56] References Cited

U.S. PATENT DOCUMENTS

| | | | |
|---|---|---|---|
| 1,913,982 | 6/1933 | Fox | 285/111 |
| 1,928,821 | 10/1933 | Santiago | 285/22 |
| 2,218,318 | 10/1940 | Pfauser | 284/19 |
| 2,265,267 | 12/1941 | Cowles | 284/19 |
| 2,735,696 | 2/1956 | Omon et al. | 137/614.05 |
| 2,825,590 | 4/1958 | Sutherland | 286/26 |
| 3,046,026 | 7/1962 | Burrows | 277/171 |
| 3,089,713 | 5/1963 | Scaramucci | 285/14 |
| 3,111,179 | 11/1963 | Albers et al. | 175/393 |
| 3,215,161 | 11/1965 | Goodwin et al. | 137/614.04 |
| 3,236,251 | 2/1966 | Hansen | 137/614.05 |
| 3,291,152 | 12/1966 | Comer | 137/614.04 |
| 3,348,575 | 10/1967 | Simak | 137/614.05 |
| 3,507,523 | 4/1970 | Cadley | 285/307 |
| 3,516,524 | 6/1970 | Kelty et al. | 192/3.3 |
| 3,550,624 | 12/1970 | Johnson | 137/614 |
| 3,618,690 | 11/1971 | Johnson | 137/514.7 |
| 3,707,878 | 1/1973 | Treichler | 92/164 |
| 3,777,771 | 12/1973 | De Visscher | 137/614 |
| 3,797,510 | 3/1974 | Torres et al. | 137/68 |
| 3,917,220 | 11/1975 | Gilmore | 251/86 |
| 4,124,228 | 11/1978 | Morrison | 285/1 |
| 4,222,411 | 9/1980 | Herzan et al. | 137/614.04 |
| 4,348,039 | 9/1982 | Miller | 285/1 |
| 4,452,462 | 6/1984 | Karr, Jr. | 277/105 |
| 4,453,566 | 6/1984 | Henderson, Jr. et al. | 137/614.02 |
| 4,582,295 | 4/1986 | Kugler et al. | 251/149.6 |
| 4,637,470 | 1/1987 | Weathers et al. | 166/344 |
| 4,641,841 | 2/1987 | Regan | 277/30 |
| 4,656,393 | 4/1987 | Amboss | 315/5.38 |
| 4,703,774 | 11/1987 | Seehausen | 137/614.04 |
| 4,709,726 | 12/1987 | Fitzgibbons | 137/614.04 |
| 4,709,727 | 12/1987 | Gober | 137/625.66 |

FOREIGN PATENT DOCUMENTS

| | | |
|---|---|---|
| 0024986 | 3/1981 | European Pat. Off. . |
| 0177650 | 4/1986 | European Pat. Off. . |
| 663132 | 10/1928 | France .............. 137/614.04 |
| 1142462 | 12/1955 | France .............. 137/614.04 |
| 76801 | 11/1958 | France .............. 137/614.04 |
| 1491524 | 6/1966 | France .............. 137/614.04 |
| 343726 | 7/1956 | Switzerland . |
| 552435 | 4/1943 | United Kingdom ........ 284/19 |
| 552682 | 4/1943 | United Kingdom . |
| 677685 | 8/1952 | United Kingdom . |
| 819421 | 9/1959 | United Kingdom . |
| 88143 | 1/1962 | United Kingdom . |
| 886133 | 1/1962 | United Kingdom . |
| 925491 | 5/1963 | United Kingdom . |
| 1548852 | 7/1979 | United Kingdom . |
| 1564906 | 4/1980 | United Kingdom . |
| 1603670 | 11/1981 | United Kingdom . |

Primary Examiner—A. Michael Chambers
Attorney, Agent, or Firm—Arnold, White & Durkee

[57] ABSTRACT

A pressure-balanced hydraulic coupling having a male and female member wherein the male member includes at least one balancing port communicating between the leading face and outer side wall. When the male member is sealed in relation to the annular elastomeric seal in the receiving chamber of the female member, and the poppet valves of each member are closed, the balancing port is used to bleed seawater into or out from the annulus between the coupling members.

15 Claims, 2 Drawing Sheets

U.S. Patent  Mar. 21, 1989  Sheet 1 of 2  4,813,454
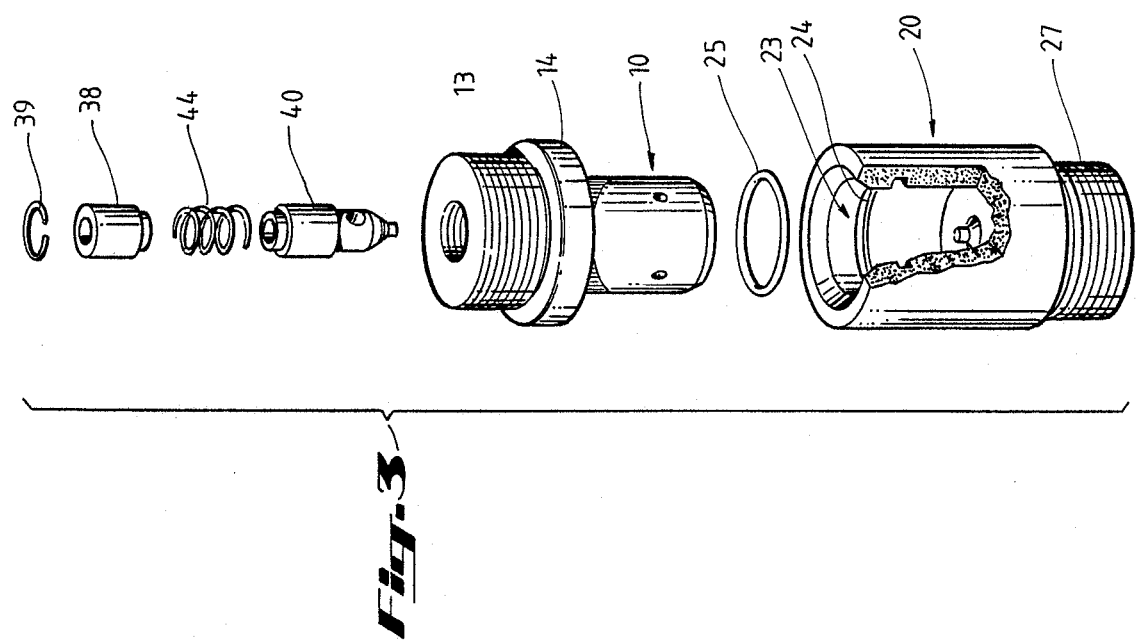
Fig. 3
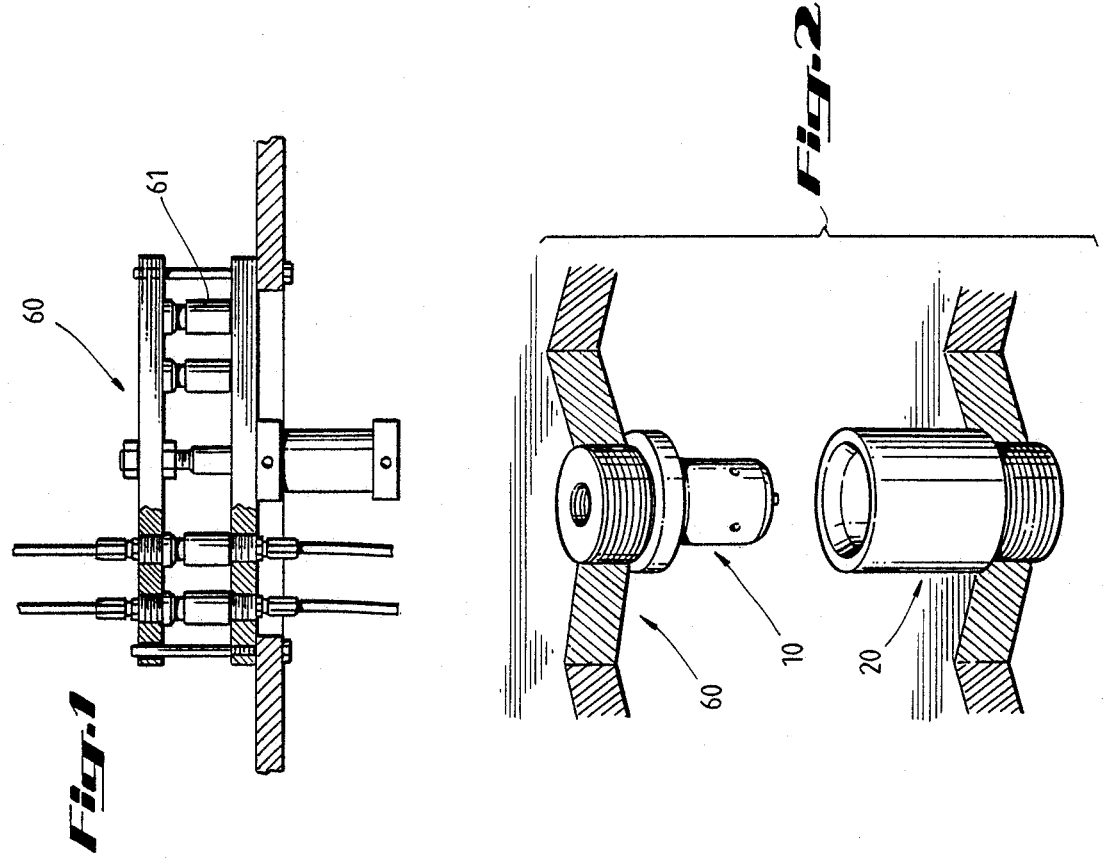
Fig. 1
Fig. 2

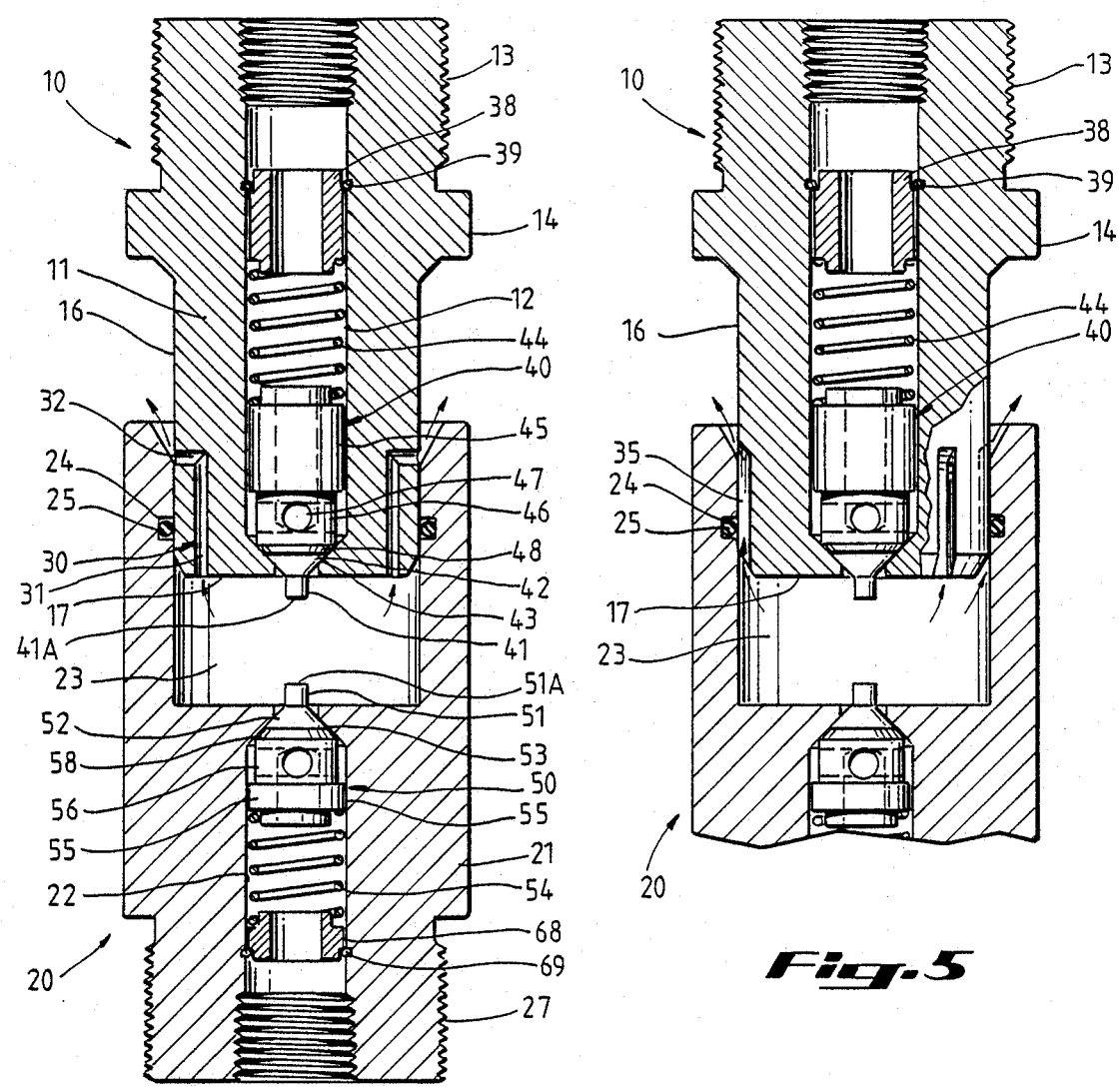

UNDERSEA COUPLING WITH PRESSURE BALANCING PORTS

BACKGROUND OF THE INVENTION

1. Field of the Invention

This invention relates, in general, to hydraulic couplings, and specifically to hydraulic couplings used in undersea drilling and production applications. More particularly, the invention involves a coupling having pressure balancing ports in the body of the male member for bleeding off seawater trapped in the annulus between the male and female members and avoiding implosion of the seal in the annulus upon disconnection of the members.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

In the use of undersea couplings, the male and female members may be interconnected or disconnected while the coupling remains underwater, either manually by a diver or automatically by a diverless system as is well know to those skilled in the art. The male member and female member are generally connected to opposing plates of a manifold and are held together by bolts or hydraulic members attached to the plates of the manifolds. The male member is commonly attached to one plate, while the female member is attached to an opposing plate so as to face the male member and align with it. The male member and female member may be attached to the manifold plates using various means, such as set screws or threads. Techniques for attaching the members to such manifold plates are well known to those skilled in the art.

The large diameter bore of the female member, which slidably receives the male member, typically includes an elastomeric annular seal within an annular grove. The elastomeric seal provides a tight fit against the longitudinal surface of the male member when the members are interconnected.

Two problems have existed with the use of undersea couplings having elastomeric seals in the bore of the female member. These problems are common to both manual and automatic systems for connection and disconnection of the coupling members.

The first problem arises during connection of the male member to the female member. When the female member is subsea, the large diameter bore of the female member becomes filled with seawater. Upon connection of the members, this trapped seawater is forced into the hydraulic system through both members of the coupling, and contaminates the hydraulic system fluid.

The second problem arises during disconnection of the coupling members. When the male member is withdrawn from the large central bore of the female member, there is a resulting low pressure area or vacuum created within that bore. When the end face of the male member passes the midpoint of the elastomeric seal in the bore of the female member, the seal no longer has the outer wall of the male member to help retain the seal in its groove. At this point the pull of the vacuum and the hydraulic pressure of seawater trying to get past the elastomeric seal implode the seal out of the groove and into the annulus between the male and female members. The vacuum also increases the difficulty of manually disengaging the male from the female member. This resistance to disengagement due to the vacuum is magnified when multiple couplings on manifold plates are disengaged. The present invention solves each of the above problems.

SUMMARY OF THE INVENTION

The present invention resides in a hydraulic undersea coupling of the foregoing type, including male and female members for fluid communication therebetween such that seawater may bleed into or out of the annulus between the members through one or more balancing ports in the male member body. Each balancing port communicates between the leading face and the longitudinal wall of the male member. The balancing port functions when the poppet valves of each coupling member are closed and the male member longitudinal wall is in sealing contact with the elastomeric seal in the female member receiving chamber.

According to the present invention, as the male member is inserted into the receiving chamber of the female member, seawater is displaced out of the receiving chamber via the balancing port. By bleeding out the trapped seawater, only a low volume of seawater remains trapped and becomes forced into the hydraulic system when the poppet valves of each member are opened. The bleed passage remains open until the end of the passage on the longitudinal wall of the male member passes the elastomeric seal.

When the male member withdraws from the female member, first the poppet valves of each member close, and subsequently the bleed passage opens for seawater to bleed into the annulus between the members, before the leading face of the male member passes the elastomeric seal. The side wall of the male member holds the elastomeric seal in its groove while seawater bleeds into the annulus and eliminates the vacuum problem. Thus the present invention greatly reduces the problem of implosion of the elastomeric seal.

BRIEF DESCRIPTION OF THE DRAWINGS

FIG. 1 is an elevational view of a manifold incorporating couplings such as that of the present invention.

FIG. 2 is a perspective view of a coupling of the present invention showing how the coupling might be connected to the manifold of FIG. 1.

FIG. 3 is an exploded perspective view of the present invention with the body partially cut away.

FIG. 4 is a section view of the male and female coupling members according to a first embodiment of the present invention, with the balancing ports open.

FIG. 5 is a section view of the male and female coupling members according to a second embodiment of the present invention, with the balancing ports open.

DETAILED DESCRIPTION OF THE PREFERRED EMBODIMENT

The preferred embodiment of the present invention comprises a male member 10, a female member 20 and fluid passages establishing fluid communication between the male member and female member when the male members is inserted into the female member receiving chamber 23. The fluid communication between the members is established when the tips 41A and 51A of the poppet valves 40 and 50 are mutually engaged during the connection of the body members. The axial movement required to connect the body members unseats the poppet valves and opens the bores of the body members to establish communication therebetween. Each poppet valve in a self-sealing coupling usually relies upon in part the fluid forces within the body member bore to maintain the poppet valve in engagement with the valve seat.

FIG. 1 is an elevational view of a manifold 60 which is commonly used with undersea hydraulic couplings. The couplings 61 are generally connected to opposing plates of the manifold and are held together by bolts or hydraulic members attached to the plates. As shown in FIG. 2, the male member 10 is commonly attached to one plate while the female member 20 is attached to the second plate so as to face male member 10 and align with it.

FIG. 3 is an exploded perspective view of the coupling of the present invention. As shown, the main components of the coupling include a female member 20, a male member 10, and an annular elastomeric seal 25. The female member 20 and the male member 10 each comprise sub-components which will be more fully described below.

As shown in FIG. 4, according to the present invention, the male member 10 comprises a body 11 with a longitudinal bore 12 extending therethrough and a poppet valve 40 slidably received in the bore. The body of the male member comprises a shoulder 14 and a handle 13 which optionally is threaded or otherwise connected to a manifold plate. The female member body 21 also includes a handle 27 which optionally may be threaded to a manifold. The male poppet valve assembly includes a valve face 42 which is held against a valve seat 43 at one end of the bore 12. The poppet valve spring 44 urges the poppet valve 40 against the valve seat 43. Poppet valve spring 44 is held in place with retainer 38 and retainer clip 39.

Typically, the poppet valve 40 includes a first hollow cylindrical section 45 slidably received within the central bore 12 of the male member, a second hollow cylindrical section 46 having a reduced diameter somewhat less than the diameter of the first cylindrical section, including apertures 47 for fluid flow from the hollow portion of the valve to the exterior of the valve. The valve face 42 is typically a conical section and optionally includes an elastomeric annular seal 48. Extending from the apex of the valve face is a poppet valve nose 41 terminating in tip 41A.

The female member 20 comprises a body 21, a central bore 22, a poppet valve 50, and a receiving chamber 23 for slidably receiving the male member therein. The poppet valve 50 of the female member is constructed substantially similar to the poppet valve 40 of the male member and comprises a first hollow cylindrical section 55 which is slidably received within the central bore 22 of the female member, a second hollow cylindrical section 56 with apertures 57, and an annular seal 58. At the apex of valve face 52 is a poppet valve nose 51 terminating in tip 51A. The poppet valve includes a valve face 52 which is held by a poppet valve spring 54 against valve seat 53. The spring 54 is anchored by retainer 68 and retainer clip 69.

The receiving chamber 23 of the female member includes a groove 24 with an annular elastomeric seal 25 for tight sealing engagement against the outer longitudinal wall 16 of the male member body. When the male member 10 is engaged to the female member 20 the respective poppet valve nose tips 41A and 51A are engaged to urge the valve face of each member away from the valve seat and establish fluid communication therebetween. At that time, the outer wall 16 of the male member has established tight and sealing fit against the annular elastomeric seal 25 in the receiving chamber.

In a first embodiment of the present invention, as shown in FIG. 4, the balancing port comprises a drilled orifice 30. The orifice comprises a first section 31 extending inwardly from the leading face 17 of the male member connected to a second section 32 extending radially to the longitudinal outer wall 16 of the male member. In this embodiment, the length of the drilled orifice preferably is such that the balancing port 30 remains open after the outer wall of the male member has reached a sealing fit against the annular elastomeric seal 25 in the receiving chamber of the female member. Therefore, trapped seawater may bleed out the balancing port after the male member has reached a tight and sealing fit with the female member, but before the poppet valves of the male member and female member have opened.

In a second embodiment, as shown in FIG. 5, the balancing port is a milled groove 35 communicating between the longitudinal outer wall 16 of the male member and the leading face 17 of the male member. As mentioned above, the balancing port, whether it is a milled groove 35 or a drilled orifice 30, should be of such a length so that the balancing port is open when the outer wall of the male member is in sealing fit against the elastomeric seal in the receiving chamber of the female member, but the poppet valves are not in an open position. Bleeding of trapped seawater in the annulus between the male member and female member is accomplished only when both poppet valves are closed.

The construction of the balancing port in either the first or second embodiment may be varied according to the present invention. A variation in the length and size of the balancing ports is governed by several factors, including the quantity of water to be expelled from or introduced into the annulus between the male and female member during connection or disconnection, the length of the outer wall of the male member and receiving chamber of the female member, and the position of the elastomeric seal relative to the receiving chamber of the female member. It should be understood that the balancing port should be open for any period during which sea water is to be expelled or introduced into the annulus between the male and female member. The end of the balancing port on the longitudinal outer wall of the male member closes when it passes the end of the receiving chamber. Thus, the length of the balancing port may be varied depending upon the desired volume of seawater remaining when the balancing port is closed.

The advantages of the present invention include reduction of seawater being forced into the hydraulic system when assembling with the coupling. The balancing port is used to expel water from the annulus between the male and female member when the male member is inserted into the female member.

Another advantage of the present invention is that the annular elastomeric seal in the receiving chamber of the female member is not imploded when dissassembling a coupling. The low pressure area or vacuum associated with removing the male member from the female member is reduced due to allowing seawater to enter the annulus during disconnection of the coupling. Seawater does not enter the annulus, however, until the poppet valves of each member are closed.

A third advantage is ease of dissassembly of the coupling. If a low pressure or a vacuum results in the annulus between the members, it is difficult to dissassemble the couplings, especially when multiple couplings are connected to opposing manifold plates. By utilizing the balancing ports, according to the present invention, this problem is eliminated and couplings may be dissassembled by applying only minimal force.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A pressure-balanced hydraulic coupling comprising:
    (a) a pair of interconnectable male and female members, each of said members having a body, a bore, and valve means movable between an open and closed position in said bore to control fluid flow therebetween, said female member having a receiving chamber for receiving said male member;
    (b) a seal in said receiving chamber for engaging said male member in sealed relation with said female member when each of said valve means is in either a closed or an open position;
    (c) a balancing port communicating between the outer surface of said male member and said receiving chamber when said male member is in sealed relation with said female member and each of said valve means is in a closed position.

2. The pressure-balanced hydraulic coupling of claim 1 wherein said valve means comprises a poppet valve having a nose section and a valve seat, said nose sections mutually engageable to force the poppet valve away from the valve seat to the open position.

3. The pressure-balanced hydraulic coupling of claim 2 wherein said members are interconnected by inserting said male member into said female member receiving chamber, said male member first engaging the seal in said receiving chamber, said nose sections then engaging to force each poppet valve into the open position.

4. A pressure-balanced hydraulic coupling comprising:
    (a) a pair of interconnectable female and male members each having a longitudinal bore extending therethrough;
    (b) a poppet valve slidably received within each of said bores and controlling fluid flow therethrough, said poppet valves slidable between a closed position and an open position upon interconnection of said members;
    (c) said female member having a central receiving chamber adjacent the bore of said female member and an annular seal intermediate said receiving chamber;
    (d) said male member being slidably received into sealed relation with said annular seal in said receiving chamber; the male member having a leading face, an outer side wall, and at least one balancing port communicating between said leading face and outer side wall, for bleeding ambient fluid into and out from said receiving chamber when the male member is sealed and said poppet valves are closed.

5. The pressure-balanced hydraulic coupling of claim 4 wherein said balancing port is an orifice communicating from the leading face to the outer side wall of said male member.

6. The pressure-balanced fluid coupling of claim 4 wherein said balancing port is a groove communicating between the outside diameter and leading face of said male member.

7. The pressure-balanced fluid coupling of claim 4 wherein said female member receiving chamber terminates at a shoulder, said shoulder having a valve seat; said female member bore extending between said valve seat and a fluid line connection.

8. A self-sealing underwater hydraulic coupling comprising:
    (a) a female member including a body, a receiving chamber, and a poppet valve for controlling fluid flow therethrough, said receiving chamber including an annular seal;
    (b) a male member slidably received within said receiving chamber, said male member including a body, a leading face, and a poppet valve for controlling fluid flow therethrough; and
    (c) a bleed passage between the leading face and body of said male member for bleeding water between said receiving chamber and ambient water external to said coupling, said bleed passage opening to bleed fluid when said male member is inserted into the receiving chamber of said female member and is sealed with said female member, said bleed passage closing prior to the commencement of fluid flow between the male and female members.

9. A pressure-balanced hydraulic coupling comprising:
    (a) a pair of interconnectable male and female members, each of the members having a body, a longitudinal bore extending through the body, and valve means movable between an open and closed position in the bore to control fluid flow through the bore, the female member having a receiving chamber adjacent the bore for slidably receiving the male member;
    (b) an annular seal in the wall of the receiving chamber engaging the outer longitudinal wall of the male member when the male member is slidably received in the receiving chamber and each of the valve means is in a closed position;
    (c) a balancing port in the body of the male member providing fluid communication between the outer longitudinal wall of male member and the receiving chamber when the male member is in sealed relation with the female member.

10. The pressure-balanced hydraulic coupling of claim 9 wherein the valve means comprises a poppet valve slidable between an open and a closed position, each poppet valve having a nose section and a valve seat, the nose sections mutually engageable to force the poppet valve away from the valve seat.

11. The pressure-balanced hydraulic coupling of claim 10 wherein the members are interconnected by inserting the male member into the female member receiving chamber, the male member first engaging the annular seal in the wall of the receiving chamber, the balancing port providing fluid communication before the nose sections engage.

12. The pressure-balanced fluid coupling of claim 9 wherein the female member receiving chamber terminates at a shoulder, the shoulder having a valve seat; the female member bore extending between the valve seat and a fluid line connection.

13. A self-sealing underwater hydraulic coupling comprising:
(a) a female member including a body, a bore extending through the body, a poppet valve for controlling fluid flow between the first end and the second end of the body, a receiving chamber, and an annular seal intermediate the receiving chamber;
(b) a male member slidably received within the receiving chamber, the male member including a body having an outer surface, a leading face at a first end of the body, and a poppet valve for controlling fluid flow between the first end and the second end of the body; and
(c) a bleed passage in the male member body for bleeding fluid between the receiving chamber and ambient fluid external to the coupling when the male member leading face has passed the annular seal, the bleed passage providing fluid communication between the first end of the male member body and the outer surface of the male member intermediate the first end and the second end, the bleed passage closing before either poppet valve opens.

14. The pressure-balanced hydraulic coupling of claim 13 wherein the bleed passage is an orifice communicating from the leading face to the outer wall of the male member.

15. The pressure-balanced fluid coupling of claim 13 wherein the bleed passage is a groove communicating between the outside diameter of the outer wall and the leading face of the male member.

* * * * *

UNITED STATES PATENT AND TRADEMARK OFFICE
CERTIFICATE OF CORRECTION

PATENT NO. : 4,813,454

DATED : March 21, 1989

INVENTOR(S) : Robert E. Smith, III

It is certified that error appears in the above-identified patent and that said Letters Patent is hereby corrected as shown below:

Title page, FOREIGN PATENT DOCUMENTS, twelfth entry, delete "88143" and insert --888143--.

Signed and Sealed this

Twenty-sixth Day of September, 1989

Attest:

DONALD J. QUIGG

*Attesting Officer*  *Commissioner of Patents and Trademarks*